United States Patent
Carpentier et al.

(10) Patent No.: US 8,181,345 B2
(45) Date of Patent: May 22, 2012

(54) METHOD FOR OPTIMIZING THE MASS OF A COMPOSITE PANEL

(75) Inventors: Alban Carpentier, Toulouse (FR); Stephane Grihon, Leguevin (FR)

(73) Assignee: Airbus Operations SAS, Toulouse (FR)

( * ) Notice: Subject to any disclaimer, the term of this patent is extended or adjusted under 35 U.S.C. 154(b) by 1135 days.

(21) Appl. No.: 11/780,842

(22) Filed: Jul. 20, 2007

(65) Prior Publication Data

US 2009/0022945 A1    Jan. 22, 2009

(51) Int. Cl.
*B21D 47/00* (2006.01)
*B21D 53/88* (2006.01)
*B23B 7/00* (2006.01)
*B23P 17/00* (2006.01)
*G05B 13/02* (2006.01)
*G06F 19/00* (2011.01)

(52) U.S. Cl. ....... 29/889.2; 29/419.1; 29/897; 29/897.2; 428/119; 700/28; 700/52; 700/97; 703/1

(58) Field of Classification Search ................. 29/419.1, 29/897, 897.2, 889.2; 428/119; 700/28, 700/52, 97; 703/1

See application file for complete search history.

(56) References Cited

U.S. PATENT DOCUMENTS

| 7,243,055 B2 * | 7/2007 | Chen et al. ......................... 703/2 |
| 2004/0035547 A1 * | 2/2004 | Grether ........................... 164/98 |

* cited by examiner

*Primary Examiner* — Alexander P Taousakis
(74) *Attorney, Agent, or Firm* — Perman & Green, LLP

(57) ABSTRACT

A method for optimizing the mass of a composite panel composed of a plurality of uniform thickness zones, each zone defined by a vertical arrangement of plies, each arrangement having a different number of piles, and different orientation angles, where a positioning order of the plies has a given orientation angle with respect to the others in the vertical arrangement, and the proportion of plies has a given orientation angle with respect to all the plies composing the vertical arrangement. The optimization includes defining a lay-up table, and defining a vertical arrangement of plies for each uniform thickness zone, and starting from the lay-up table, building a function describing the physical properties of each zone as a function of the total thickness of each zone, where the total thickness for each zone is adjusted using a discrete variables iteration process, until the mass of the panel is a minimum.

11 Claims, 5 Drawing Sheets

METHOD FOR OPTIMIZING THE MASS OF A COMPOSITE PANEL

The disclosed embodiments relate to a method for optimizing the structure of a strengthened composite panel. More particularly, the method comprises a series of steps, each step including an iterative process used for adjusting the panel design parameters so as to minimize the mass of the panel. The design parameters obtained by the method for producing the composite panel must comply with the industrial production rules and the stiffness and buckling resistance properties of a strengthened composite panel submitted to a load multicase.

BACKGROUND

Aeronautical structures are mainly composed of composite panels 1 (FIG. 1) which are generally composed of skins 3 reinforced in the longitudinal and orbital directions by strengtheners 2 respectively designated as stringers and frames, for example. The presence of these strengtheners is aimed at protecting the structure from buckling and at limiting the propagation of cracks.

Such panels are mainly composed of composite materials having particularly interesting properties for many industries. As a matter of fact, they have a great mechanical and thermal resistance in spite of a low mass, and they also allow for large design freedom and easy maintenance.

Composite materials are generally composed of reinforcing fibres buried in a polymer matrix. Such materials, which are defined as plies, are then stacked, according to a given sequence, to form a laminate which composes the skin of the composite panel.

Physical properties such as the buckling resistance and the stiffness of the panel are defined by the vertical arrangement of individual plies within the laminate. Such vertical arrangement is defined by the following design parameters: the number of plies, the order in which the positioning of plies having a determined orientation angle, the proportion of plies having an orientation angle defined with respect to the whole panel.

The composite panel is further composed of a group of zones which are submitted to various load cases and various dimension constraints, and it is thus necessary to define a vertical arrangement of plies for each panel zone.

It is then possible to modify such parameters so as to minimize the panel mass while increasing the structural performance of the panel.

Optimizing a laminated composite panel is however a complex problem as regards its solution as well as its definition which must take many feasibility criteria into account. As for aeronautical structures, for example, criteria of mass, stiffness, buckling resistance must be optimized while keeping in mind the design cost of such structures. Thus, the optimization process is a relatively complex combinatory problem because of the important number of variables and constraints involved and it also must take into account the calculation time.

The general approach consists in using a method for digitally optimizing the dimension and lay-up rules constraint parameters to reach the optimum solution(s).

A one-step optimization method is known, which uses a Genetic Algorithm (GA) based on a population of solutions which will evolve from generation to generation and get closer to the optimum solution. Such optimization method however implies a relatively important amount of time for evaluating all the calculation constraints. Therefore, the calculation time required for converging toward the optimum solution is not appropriate for industrial applications. As a matter of fact, the calculation time of Genetic Algorithms rapidly increases in time. Besides, the important number of lay-out rules generally entails a difficult convergence towards a proper solution.

An hybrid algorithm which combines the Genetic Algorithm and direct research is known. A master stack of plies which is applied to the whole panel is firstly determined using the GA. The number of plies to be positioned on each panel zone is then determined, using the direct research method. This method uses an approach to the optimization issue by assuming a simplified hypothesis about the ply loss rules which does not make it possible to render the real case of a composite panel.

A two-level optimization approach has recently been provided to solve the multi-criteria optimization issue, in which:

the number of plies per angle with the variable constraints is optimized to impart a continuity in thickness between adjacent zones, the stacking sequence is locally optimized in parallel with an exchange of information between the optimization of two adjacent zones.

But this two-level approach does not make it possible to obtain ply continuity between two adjacent uniform thickness zones, therefore not industrially applicable.

It would be advantageous to provide an optimization method having simple design and operation, being time-saving and flexible as regards calculation, and making it possible to obtain an optimum arrangement of plies for the whole strengthened composite panel, while taking into account the criteria of structural stiffness and resistance, the laminate fabrication rules and the condition of ply continuity between two adjacent uniform thickness zones.

SUMMARY

Therefore, the disclosed embodiments relate to the method for optimizing the mass of a composite panel, the said panel being composed of a plurality of uniform thickness zones, each uniform thickness zone being defined by a vertical arrangement of plies having different orientation angles, the said arrangement being defined by a determined number of plies, a positioning order of the plies having a given orientation angle with respect to the others in the vertical arrangement, and the proportion of plies having a given orientation angle with respect to all the plies composing the vertical arrangement, characterized in that the said optimization method includes the following main steps:

a lay-up table is defined, the said table defining a vertical arrangement of the plies for each uniform thickness zone, starting from the said lay-up table, a function describing the physical properties of each zone of the composite panel is built, as a function of the total thickness of each zone, the total thickness for each zone is adjusted using a discrete variables iteration process, the aim of the process being reached when the mass of the panel is minimum.

Advantageously, the step a) for defining the lay-up table includes a preliminary step for building the table wherein, idealistic proportions of plies having a given orientation angle with respect to the total thickness are determined for each uniform thickness zone of the panel using a discrete variables iteration process, so as to minimize the total mass of the panel.

According to one embodiment, upon completion of the said preliminary step, for each uniform thickness zone, a function giving the proportion of plies having a given orientation angle as a function of the total thickness is defined and the optimum total thickness is determined using a discrete variables iteration process, so as to minimize the total mass of the panel.

Advantageously, the derivative of the said function is positive so as to impart ply continuity between two adjacent uniform thickness zones.

Prior to performing step b) the positioning order of the plies having a given orientation angle different from the others in the laminate for each uniform thickness zone is adjusted using a discrete variables iteration process, the aim of the process being reached when the buckling resistance corresponds to a predefined threshold value.

In another embodiment of the method for performing step b) of the method, the lay-up table of step a) is a pre-existing lay-up table.

Upon completion of step b), the exact number of plies is determined for each uniform thickness zone of the panel using a discrete variables iteration process, the aim of the process being reached when the mass of the panel is minimum.

According to a particular embodiment of the method according all the plies composing the vertical arrangement have the same thickness.

Advantageously, the method according to this embodiment can be applied to a plane or curved composite panel.

The disclosed embodiments also relate to a strengthened composite panel produced from the optimal vertical arrangement of plies for each thickness zone obtained through the above mentioned method and the use of such a panel produced as an equipment for an aircraft.

BRIEF DESCRIPTION OF THE DRAWINGS

The disclosed embodiments will be described in greater details with reference to the enclosed drawings in which.

DETAILED DESCRIPTION

Figure 1:
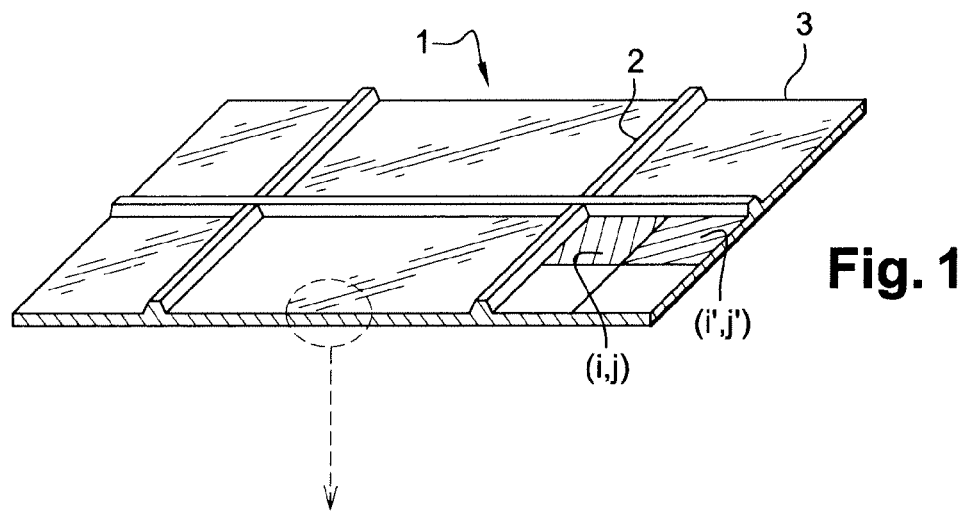
FIG. 1 shows the diagram of the method according to one embodiment.

FIG. 1 schematically shows a top view of a conventional composite panel 1 composed of a skin 3 reinforced by the presence of strengtheners 2 placed in the transversal and in the longitudinal directions.

The panel 1 is composed of any number of superimposed plies, each ply being composed of reinforcing fibres buried in a polymer matrix. The physical properties of the panel are mainly defined by the orientation of the fibres of each ply with respect to the global coordinates system, the number of plies and the vertical arrangement of the plies having a given orientation angle with respect to the others in the vertical arrangement.

The skin 3 of the composite panel 1 is composed of a plurality of uniform thickness zones bearing reference indices (i, j) in FIG. 1.

Each uniform thickness zone is defined by a vertical arrangement of plies having different orientation angles.

Figure 2:
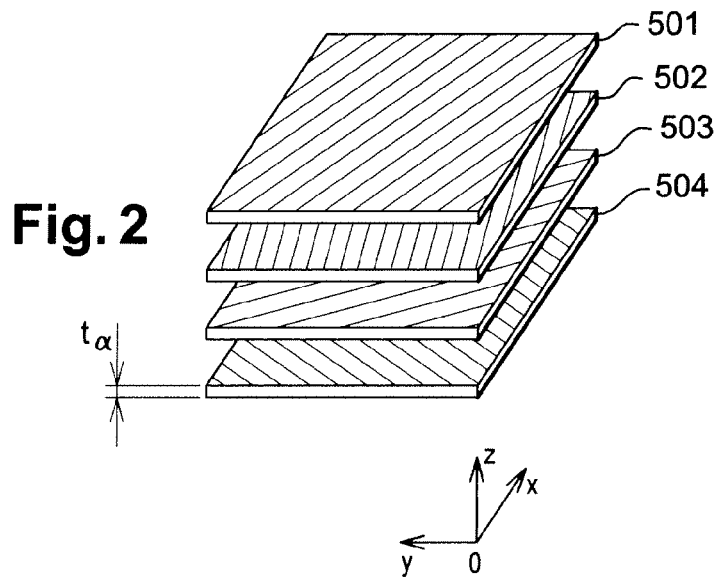
FIG. 2 schematically shows a top view of a strengthened composite panel.

For illustration purposes, FIG. 2 shows an example of panel composed of four plies 501, 502, 503, 504, a different angle orientation α in a global coordinates system (Oxyz) and a different thickness $t_\alpha$ being associated to each ply. The plies orientation angles are generally limited to 0°, 45°, −45° and 90°. Generally speaking, the 45° ply and the −45° ply have the same thickness. An identical thickness can also be defined for all the plies composing the vertical arrangement.

Such vertical arrangement is defined by the following parameters: a determined number of plies, a positioning order of plies having a given orientation angle with respect to the others in the vertical arrangement, and the proportion of plies having a given orientation angle with respect to all the plies composing the vertical arrangement.

Figure 3:
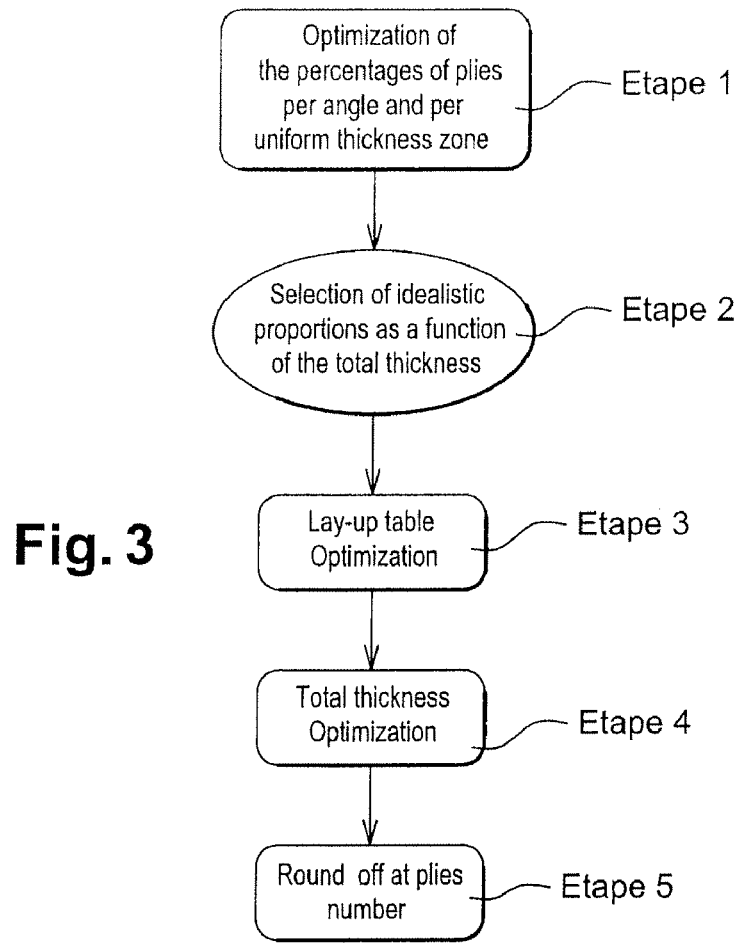
FIG. 3 is an exploded view of the superimposition of plies composing the skin of the composite panel shown in FIG. 1, each ply having a different direction in an orthogonal coordinates system.
Figure 4:
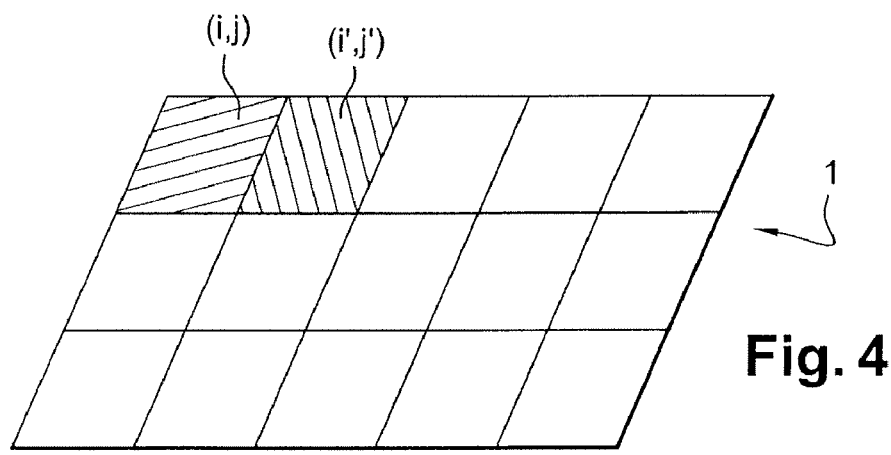
FIG. 4 schematically shows a panel divided into a set of uniform thickness zones bearing reference indices (i, j)

The method according to this embodiment is to completely define an optimum structure as regards the mass of the composite panel skin, while taking into account the stiffness criterion (panel behaviour in the plane), the stability criterion (panel behaviour out of the plane), and the mass and cost criteria. The method according to this embodiment includes five steps whose diagram is shown in FIG. 3, each step including a continuous variables or discrete variables iterative process by means of which the panel design parameters are adjusted so as to minimize the mass of the panel. The lay-up table obtained upon completion of the optimization method according to the embodiment must comply with the lay-up rules used in the industry, so that it can be used directly for industrial production.

The optimization method according to the embodiment is composed of five steps (FIG. 3):

a preliminary step for optimizing thicknesses per zone and per orientation angle (step 1);

a step for selecting the idealistic proportions as a function of the total thickness (step 2);

a step for defining the optimized lay-up table as regards the buckling resistance (step 3);

a step for optimizing the total thickness associated to the lay-up table (step 4);

a step for rounding the number of plies to an integer for each thickness zone (step 5).

The principal concept of the embodiment is based on a step-by-step optimization strategy, each step making it possible to obtain useful information for the following steps. The method according to the embodiment mainly makes it possible to optimize total thicknesses (step 4) while taking into account the plies vertical arrangement by means of the lay-up table defined in step 3 which creates a bi-unique bond between the thickness and the arrangement while complying with the production rules. More particularly, the lay-up compatibility between two adjacent zones is guaranteed, since the passage from one thickness to another is secured by ply losses, while complying with the production rules.

Steps 1 and 2 are preliminary steps which make it possible to obtain, for each uniform thickness zone respectively, idealistic proportions of plies having a given orientation angle with respect to the total thickness and the optimum total thickness. The given proportions obtained upon completion of such steps make it possible to build the lay-up table more easily.

Step 5, which is a rounding step, makes it possible to pass from one continuous solution obtained upon completion of step 4 to a real lay-up table by determining the exact number of plies which is an integer, such lay-up table being directly usable for producing the composite panel.

Each step includes a discrete variables (step 3, step 5) or continuous variables (step 1, step 2, step 4) iteration process and makes it possible to generate optimum results which are used in the next step.

Advantageously, such multi-step optimization approach makes it possible to implement a computer system adapted to each step, more particularly existing optimization program codes, in order to optimize the calculation time.

Details on the 5 steps are given hereinunder.

Firstly, the panel is modelized by a system whose behaviour as a membrane is homogenous throughout the thickness of the panel. Such assumed homogeneity makes it possible to render the apparent stiffness components of the whole stack of plies: $E_x$, $E_y$, $G_{xy}$, $V_{xy}$, $V_{yx}$ from the system stiffness and constraint matrix.

In a first preliminary step (FIG. 3), the thickness per orientation of each uniform thickness zone $t_\alpha^{i,j}$ is optimized with respect to the total thickness of each zone $t_{tot}^{i,j}$ with a view to minimizing the mass of the panel, the result obtained upon completion of this first step is a first distribution of thicknesses associated to idealistic proportions for each constant thickness zone of the said panel. Idealistic proportions of plies having a given orientation angle with respect to the total thickness are determined for each uniform thickness zone.

For this purpose, a continuous variables algorithm is used, whose variables are based on the function gradients for each uniform thickness zone (i, j). The function to be minimized is the total panel mass. The optimization continuous variables are the thickness per orientation and per thickness zone given as zone $t_\alpha^{i,j}$, $\alpha$ being the orientation angle. To each thickness zone is associated a local variable which is the total thickness of each zone $t_{tot}^{i,j}$, and the material characteristics defined by the stiffness components: $t_\alpha^{i,j} = F(t_{tot}^{i,j})$. The system of equations to be solved then includes n−1 functions for n plies, if the functions are linear.

Figure 5:
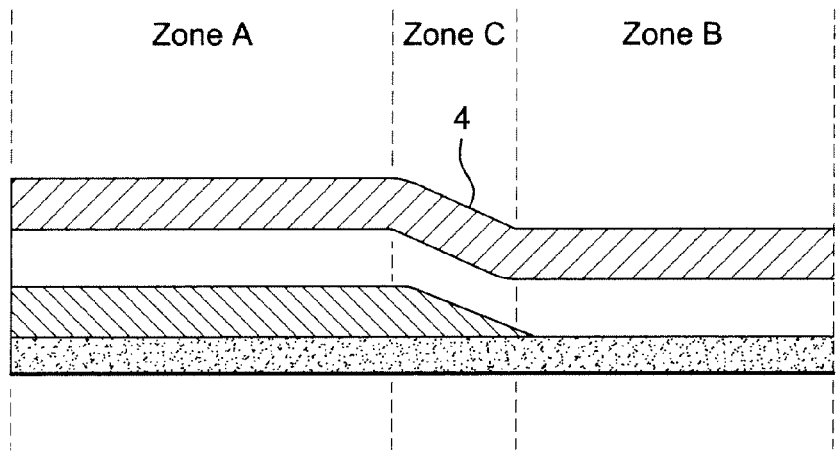
FIG. 5 schematically shows a sectional view between two zones A and B having different thicknesses, a continuity zone connecting the two zones.
Figure 6:
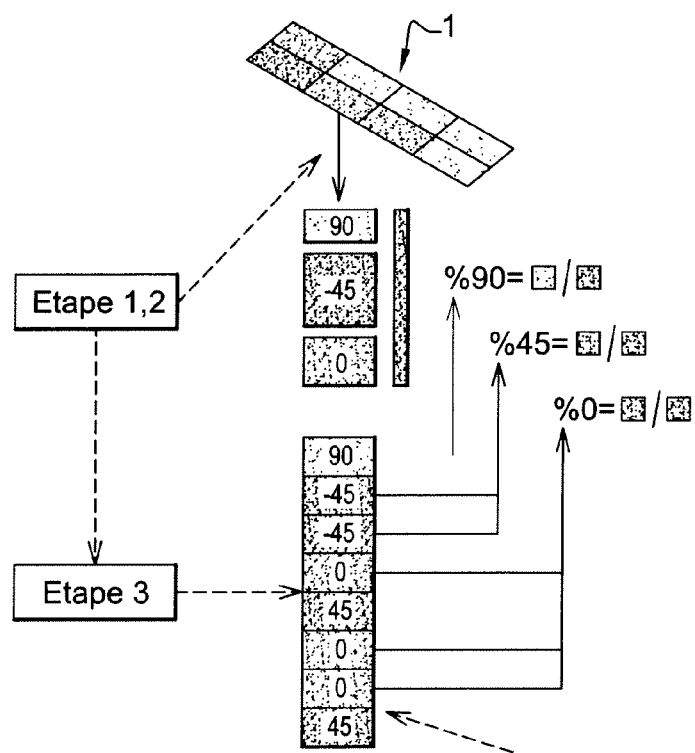
FIG. 6 schematically shows the various steps composing the method.
Figure 6:
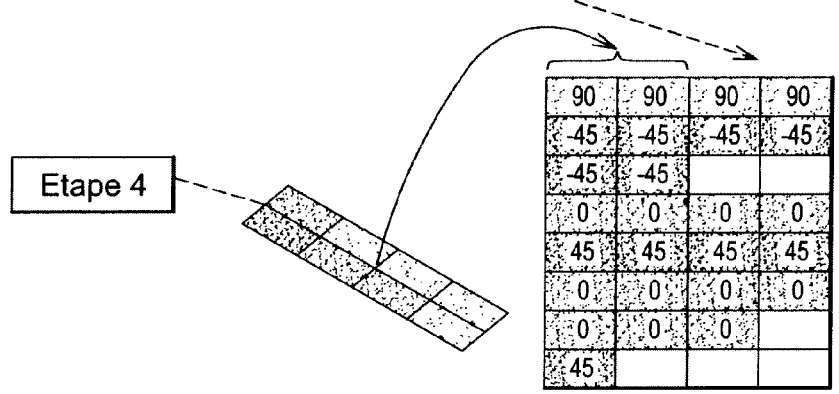

In a preferred and particularly advantageous embodiment, the method includes a condition where a continuity of plies between two zones having different thicknesses is imposed. Such condition is illustrated in FIG. 5 by means of a sectional view of a stack of plies, for illustration purposes, including two zones having different thicknesses designated A and B. Zone A includes 4 plies and zone B includes 3 plies. In prior art optimization methods, it is generally assumed that a steep transition exists between the two adjacent zones. In fact, a continuity zone C exists between the two zones A and B and this transition is defined by a slope 4. This is formulated by a positive derivative of the thickness per orientation and of the total thickness per thickness zone with respect to thickness: $\delta t_\alpha^{i,j} / \delta t_{tot}^{i,j} \geq 0$.

This first optimization step makes it possible to determine a thickness distribution associated to idealistic proportions for each uniform thickness zone.

In a second optimization step, when the thickness per orientation as a function of the total thickness for each zone is set, a function giving the proportion of plies having a given orientation angle as a function of the total thickness is defined and the optimum total thickness is determined using a continuous variables iteration process, so as to minimize the mass. This second preliminary step consists in consolidating the optimization obtained from the first optimization step, which means making a compromise between the various idealistic proportions resulting from the first step.

The proportions obtained upon completion of such two preliminary steps are used for building the lay-up table which is concerned by step 3.

In this third step, the lay-up table, i.e. the plies stacking order, is optimized while only taking into account the criteria which are influenced by the order of the plies having a given orientation angle with respect to the others in the vertical arrangement which composes the panel, for example, the buckling resistance, while complying with the proportions selected upon completion of the preliminary steps. Such third step aims at enhancing the buckling resistance by modifying the plies order by means of a discrete variables iteration process.

A discrete variables Algorithm, for example the genetic Algorithm is used with a repair module to supply valid lay-up tables taking account of the production and lay-up rules. For example, one lay-up rule says that there should not be more than 3 adjacent plies having the same orientation or no more than 4 contiguous plies of the same orientation. It should be noted that such rules vary depending on industrial sectors and composite panel manufacturers.

Figure 7:
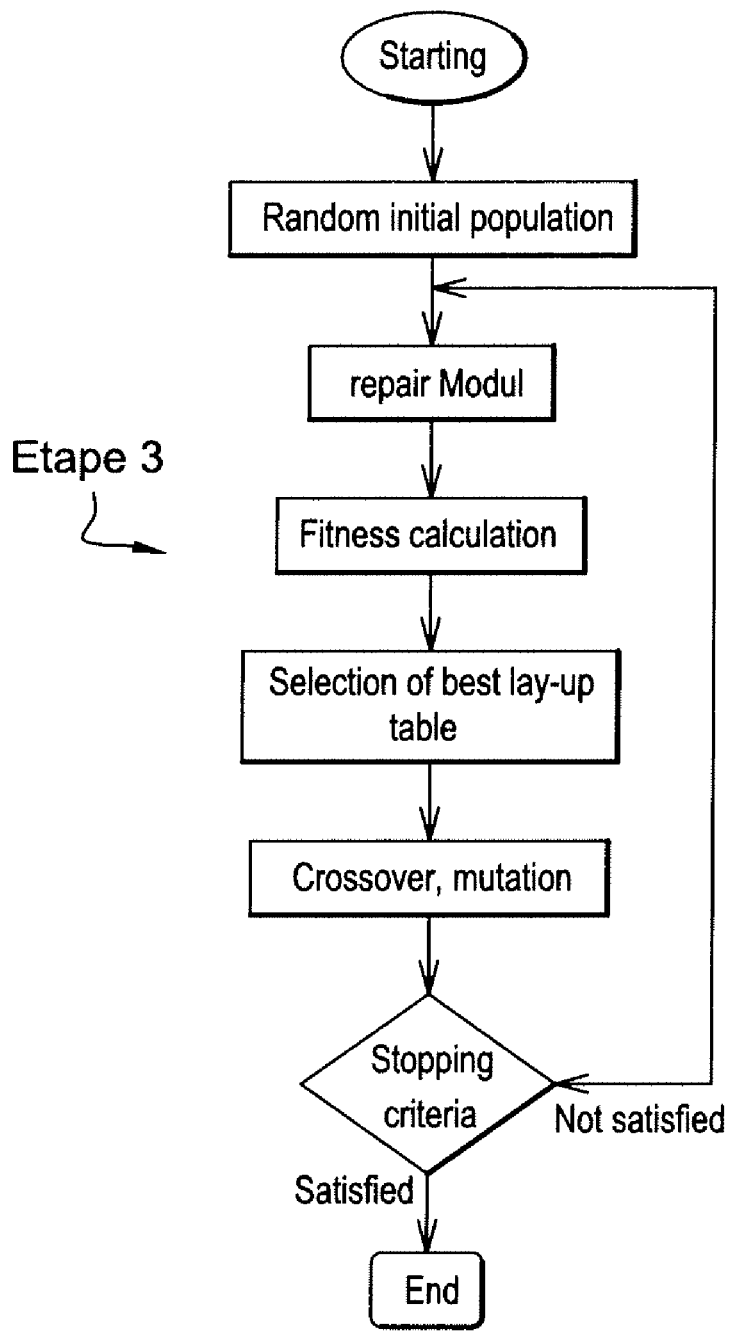
FIG. 7 shows the diagram of the optimization of the lay-up table.
Figure 8:
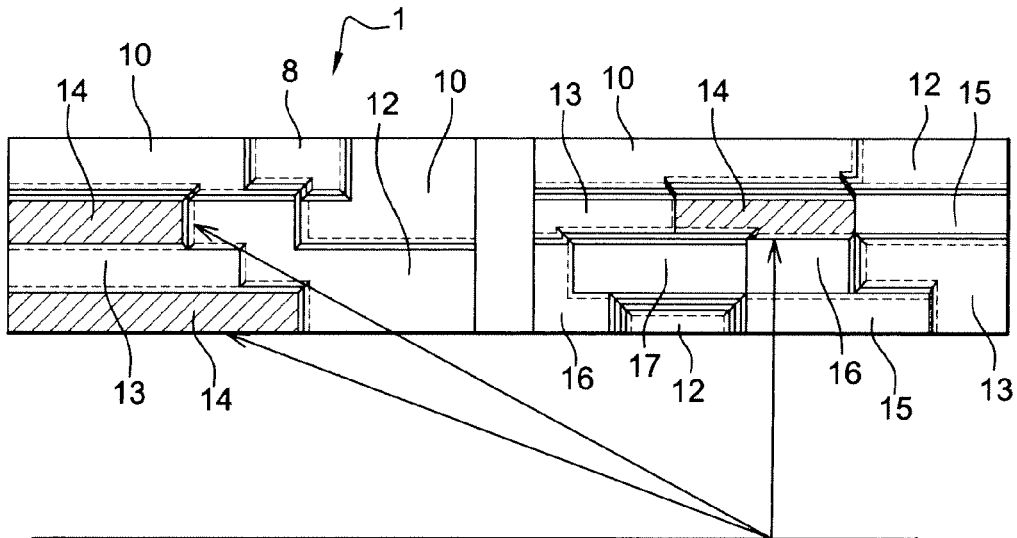
FIG. 8 schematically shows a lay-up table obtained upon completion of the optimization method according to one embodiment.

FIG. 7 shows the diagram of such discrete variables iteration process to optimize the lay-up table. Starting from a random population, the process makes a group of individuals evolving towards the optimum of an optimization issue, which consists for example in enhancing the buckling resistance. Such evolution is attained through 3 operators: combination, mutation and selection.

Within the application of this process to the optimization of a lay-up table, the selection operator consists in selecting the best lay-up tables for each generation according to the problem fitness criterion (fitness function), the combination and mutation operators make it possible to have a larger population by introducing something new from one generation to another.

Advantageously, the fitness function takes into account not only the criteria influenced by the order of plies, such as the buckling resistance, but also the idealistic proportions obtained upon completion of step 2.

The stopping criteria for such a process may be imposed by the calculation time. Then the originally defined number of generations stops the iteration process.

The process may be stopped when the population does not evolve any longer, or evolves very slowly, which means the population is close to optimum values.

In a fourth optimization step a function describing the physical properties of each zone as a function of the total thickness is built from the optimized lay-up table obtained upon completion of the preceding step, and the total thickness is adjusted using a continuous variables iteration process, with a view to minimizing the mass.

A continuous variables algorithm is used, the variables being based on the function gradients.

Upon completion of this mentioned fourth optimization step, a distribution of idealistic total thicknesses is obtained for each zone, as regards the mass.

In another embodiment, the lay-up table is not determined from a calculation tool, as mentioned here but it can also be a pre-existing table of a previous design and manually produced by an operator.

The last step of the method consists in optimizing the number of plies per uniform thickness zone in order to obtain a minimum thickness while complying with the dimension criteria.

As the number of plies is a discrete variable, an algorithm of the genetic type is used for determining the optimum number of plies which guarantees a minimum mass while complying with all the dimension criteria.

Such last step can also be carried out manually so as to provide for a lay-up table usable to directly produce the panel.

The optimization method described above can advantageously be applied to any panel shape, provided the dimension criteria are modified, for a plane or a curved panel.

Advantageously, the method can be applied to plies are unidirectional pre-impregnated plies as well as to woven plies.

Although the issue is divided into several optimization steps, there exist, between each step, exchange of information so that the problem approach provided by the method according to the embodiment remains a coupled problems approach.

Advantageously, the multi-step strategy also makes it possible to adapt the method to industrial objectives, i.e. executing the levels depending on the parameter to be optimized, for example only a mass reduction or the estimation of the lay-up table feasibility.

The method makes it possible to provide for optimized design parameters for designing a strengthened composite panel with a relatively short calculation time, the thus obtained panel having enhanced physical characteristics in spite of a minimum mass.

The advantage of the present embodiment resides in the use of a lay-up table which makes it possible to reach a solution directly usable for producing the panel while preserving a continuous optimization approach. The bi-unique bond between the lay-up table and the thickness further makes it possible to associate an arrangement with a thickness while selecting the closest number of plies.

The method thus makes it possible to limit the combination part of the optimization method (discrete variables) to a minimum issue (table optimization) and to handle the real issue on a structural scale by means of a continuous variables iteration process.

Such a composite panel can be used in any industrial sector to be mounted on equipment which must have very special or even antagonist mechanical characteristics to make it efficient. Such composite panels thus contribute to safety enhancement through a better resistance to impact and fire, while contributing to minimizing structural parts, which constitutes one essential stake for aeronautical industry.

The invention claimed is:

1. A process for making a composite panel, said panel being composed of a plurality of uniform thickness zones, each uniform thickness zone being defined by a vertical arrangement of plies having different orientation angles, said arrangement being defined by a determined number of plies, a positioning order of the plies having a given orientation angle with respect to the others in the vertical arrangement, and the proportion of plies having a given orientation angle with respect to all the plies composing the vertical arrangement, said process comprising:
a first step of defining a lay-up table describing an optimal arrangement of plies taking into account mass constraints as well as structural constraints imposed to the panel;
a second stage comprising producing the panel, including arranging the panel to include different plies with different orientation angles in accordance with the optimal arrangement described in the table lay-up, so as to realize said plurality of zones of uniform thickness;
the first step further comprising the steps of:
defining a lay-up table, said table defining a vertical arrangement of the plies for each uniform thickness zone;
starting from said lay-up table, building a function describing the physical properties of each zone of the composite panel as a function of the total thickness of each zone;
adjusting the total thickness for each zone using a discrete variables iteration process, to minimize the mass of the panel,
said adjustment of the total thickness for each uniform thickness zone resulting in a modification of the number of plies for each of said uniform thickness zones using the corresponding lay-up table.

2. The process according to claim 1, wherein defining the lay-up table includes building the table by determining idealistic proportions of plies having a given orientation angle with respect to the total thickness for each uniform thickness zone of the panel using a discrete variables iteration process, so as to minimize the total mass of the panel.

3. The process according to claim 2, further comprising upon completion of building the table:
defining a function giving the proportion of plies having a given orientation angle as a function of the total thickness for each uniform thickness zone; and
determining the optimum total thickness using a discrete variables iteration process, so as to minimize the total mass of the panel.

4. The process according to claim 3, wherein the derivative of the said function is positive so as to impart ply continuity between two adjacent uniform thickness zones.

5. The process according to claim 1, comprising, prior to building a function describing the physical properties of each zone of the composite panel:
adjusting the positioning order of the plies having a given orientation angle different from the others in the arrangement for each uniform thickness zone using a discrete variables iteration process, the aim of the process being reached when the buckling resistance corresponds to a predefined threshold value.

6. The process according to claim 1, the lay-up table is a pre-existing lay-up table for building the function describing the physical properties of each zone of the composite panel.

7. The process according to claim 1, wherein upon completion of building a function describing the physical properties of each zone of the composite panel, determining the exact number of plies for each uniform thickness zone of the panel using a discrete variables iteration process, the aim of the process being reached when the mass of the panel is minimum.

8. The process according to claim 1, wherein all the plies composing the vertical arrangement have the same thickness.

9. The process according to claim 1, wherein the said composite panel is a plane or curved panel.

10. The process according to claim 1, wherein the plies are unidirectional pre-impregnated plies.

11. The process according to claim 1, wherein the plies are woven plies.

* * * * *